United States Patent
Chen

(10) Patent No.: US 6,286,572 B1
(45) Date of Patent: Sep. 11, 2001

(54) SHOCK-ABSORBING SAFETY WHEEL FOR MOTOR VEHICLES

(76) Inventor: Ling-Lea Chen, P.O. Box 697, Feng-Yuan City 420 (TW)

( * ) Notice: Subject to any disclaimer, the term of this patent is extended or adjusted under 35 U.S.C. 154(b) by 0 days.

(21) Appl. No.: 09/706,622

(22) Filed: Nov. 4, 2000

(51) Int. Cl.⁷ .................................................. B60B 9/04
(52) U.S. Cl. ........................ 152/84; 152/69; 152/393; 301/37.24; 301/37.37
(58) Field of Search .................... 152/17, 69, 80, 152/84, 86, 1, 5, 11, 12, 393, 394, 323; 301/37.1, 37.24, 37.37

(56) References Cited

U.S. PATENT DOCUMENTS

| | | | |
|---|---|---|---|
| 916,122 | * 3/1909 | Doyle . | |
| 1,021,440 | * 3/1912 | Arnold et al. . | |
| 1,115,178 | * 10/1914 | Davis . | |
| 1,117,135 | * 11/1914 | Lewis et al. . | |
| 1,222,233 | * 4/1917 | Mitchell . | |
| 1,249,273 | * 12/1917 | Bohannon . | |
| 1,309,839 | * 7/1919 | Bowman . | |
| 2,140,431 | * 12/1938 | Morphew . | |

* cited by examiner

Primary Examiner—Russell D. Stormer

(57) ABSTRACT

A shock-absorbing safety wheel includes a rim, a hub at the center of the rim and connected by a plurality of spring plates and radial support, and a solid tire slidably mounted on the outer periphery of the rim and secured by a pair of rim shields. It is characterized that the spring plates provide shock-absorbing function to the wheel and the tire is made of solid rubber which will not become flat, which eliminates the need to carry a spare wheel.

2 Claims, 4 Drawing Sheets

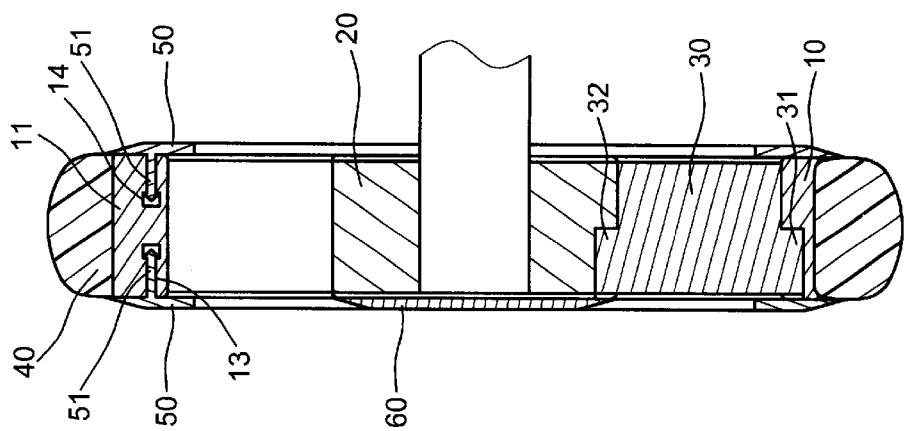
FIG. 4 (3—3)
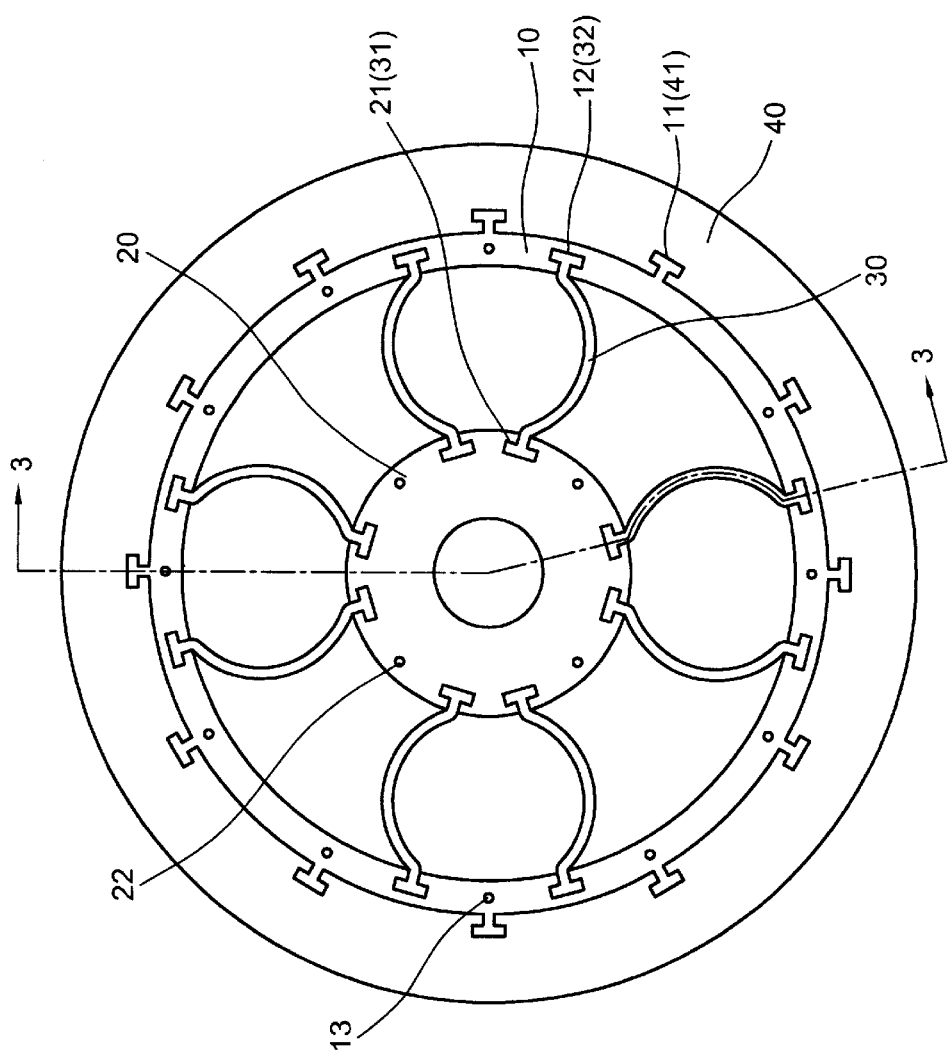
FIG. 3

SHOCK-ABSORBING SAFETY WHEEL FOR MOTOR VEHICLES

BACKGROUND OF THE INVENTION

The present invention relates to wheels and more particularly to a shock-absorbing safety wheel for motorized vehicles which provides shock-absorbing device in the rim of a wheel to greatly improve shock-absorbing effect for the motorized vehicles.

Conventional rim of wheel is made of rigid metallic material which has no any elasticity except the tire which is made of rubber and inflatable may provides a less shock-absorbing effect. Therefore, the automobiles, motorcycles or other motorized vehicles mostly depend upon the leaf spring, hydraulic devices or springs to obtain their shock-absorbing effect. It is known that the wheel may also provide the shock-absorbing effect for the vehicle.

SUMMARY OF THE PRESENT INVENTION

The present invention has a main object to provide a shock-absorbing safety wheel for motorized vehicles which provides a shock-absorbing device in the rim to improve the shock-absorbing effect for a motorized vehicle.

Another object of the present invention is to provide a shock-absorbing safety wheel for motorized vehicle in which the tire is solid without inflation so that the user need not carry a spare tire.

Further object of the present invention is to provide a shock-absorbing safety wheel for motorized vehicles which is easy to assemble.

The present invention will become more fully understood by reference to the following detailed description thereof when read in conjunction with the attached drawings.

BRIEF DESCRIPTION OF THE DRAWINGS

FIG. 3 is a side view to show an assembly of FIG. 1, FIG. 4 is a sectional view taken along line 3—3 of FIG. 3.

DETAILED DESCRIPTION OF THE PREFERRED EMBODIMENT

Figure 1:
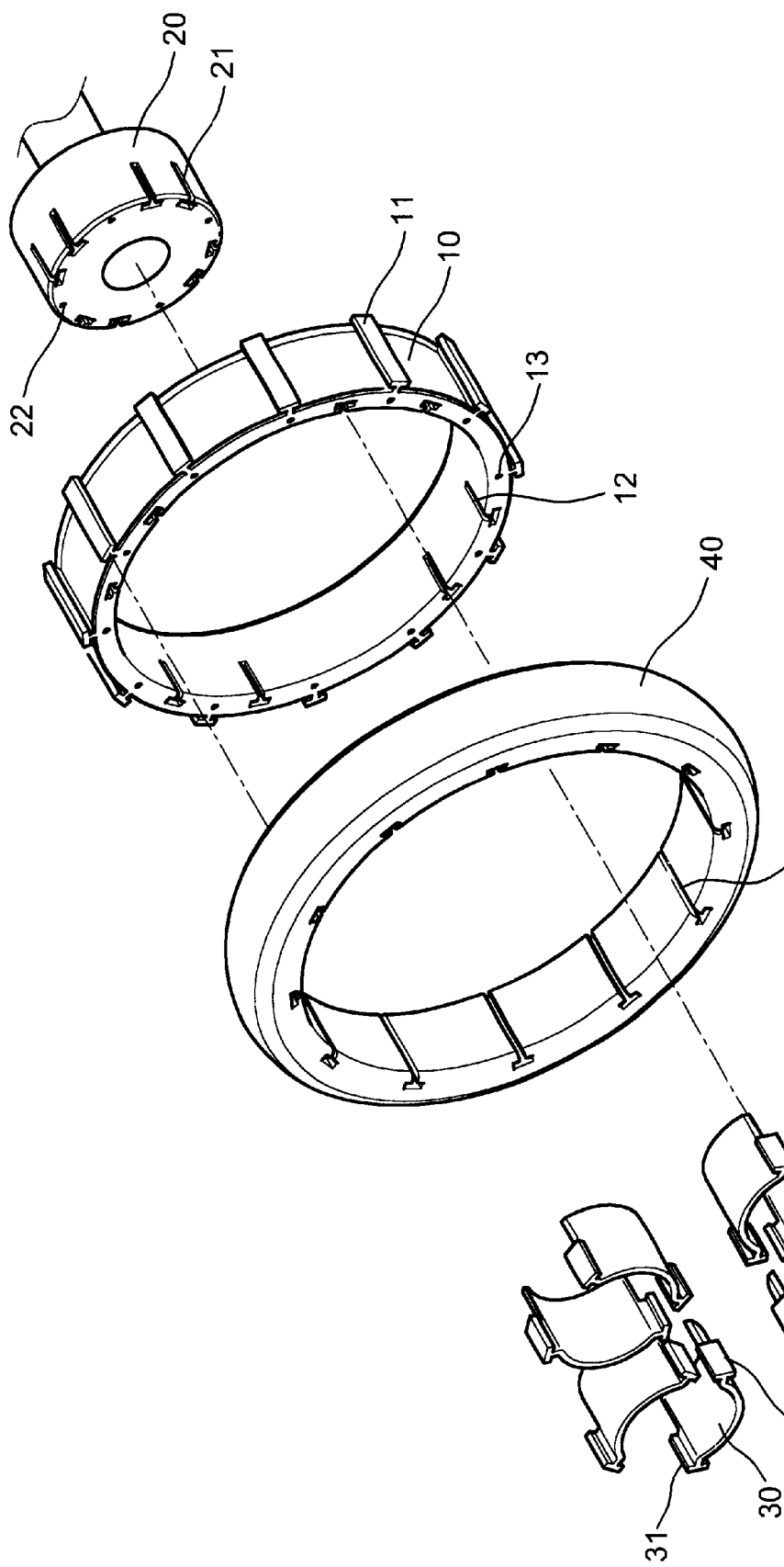
FIG. 1 is an exploded perspective view to show a shock-absorbing safety wheel according to the preferred embodiment of the present invention.
Figure 2:
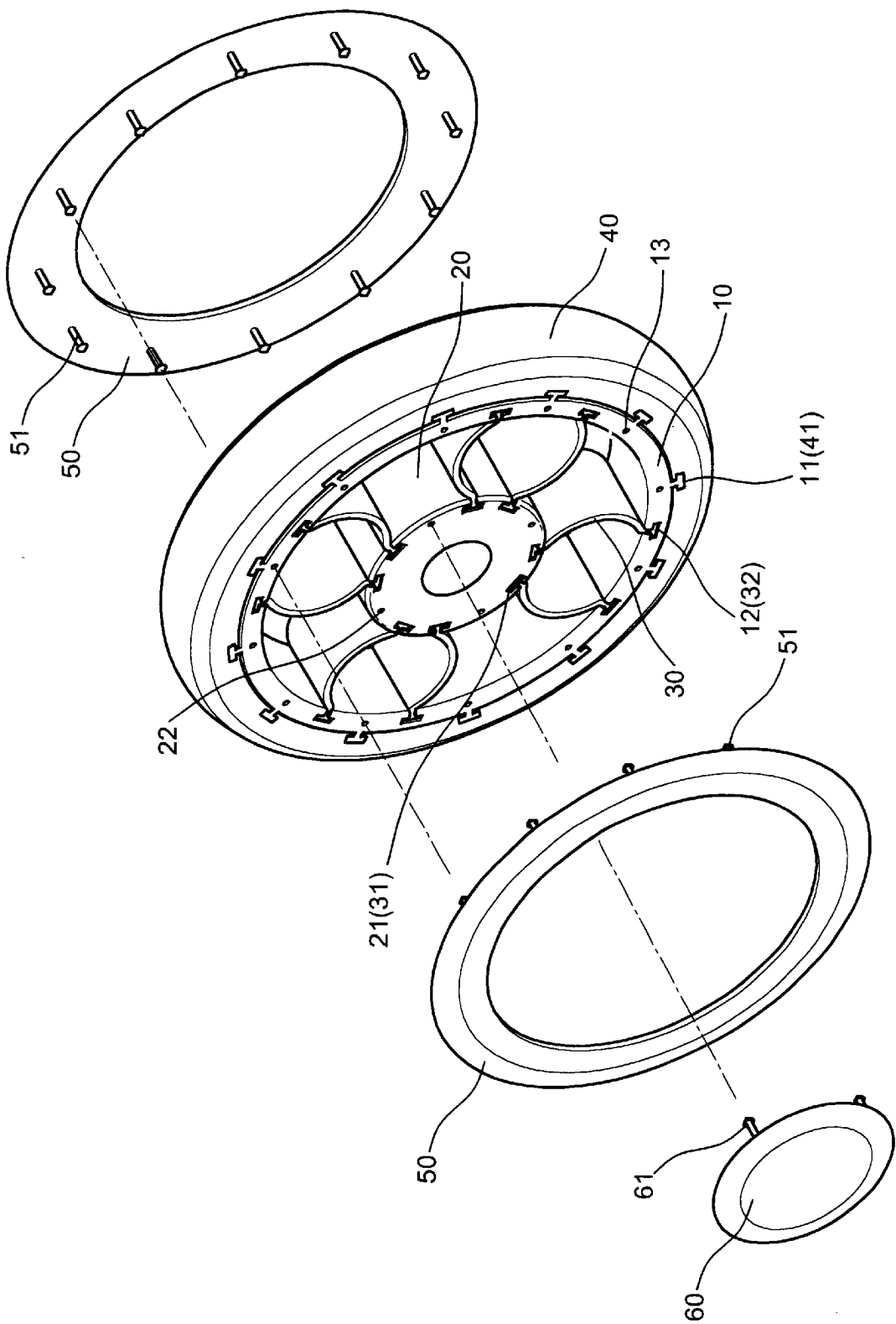
FIG. 2 is an exploded perspective view of FIG. 1 where the solid tire is mounted on the rim.

With reference to FIGS. 1 to 5, of the drawings, the shock-absorbing safety wheel for motorized vehicles of the present invention comprises generally a rim 10, a hub 20, a plurality of arcuate spring plate 30, a solid tire 40, a pair of rim shields 50, a hub shield 60 and a plurality of radial supports 70.

Figure 5:
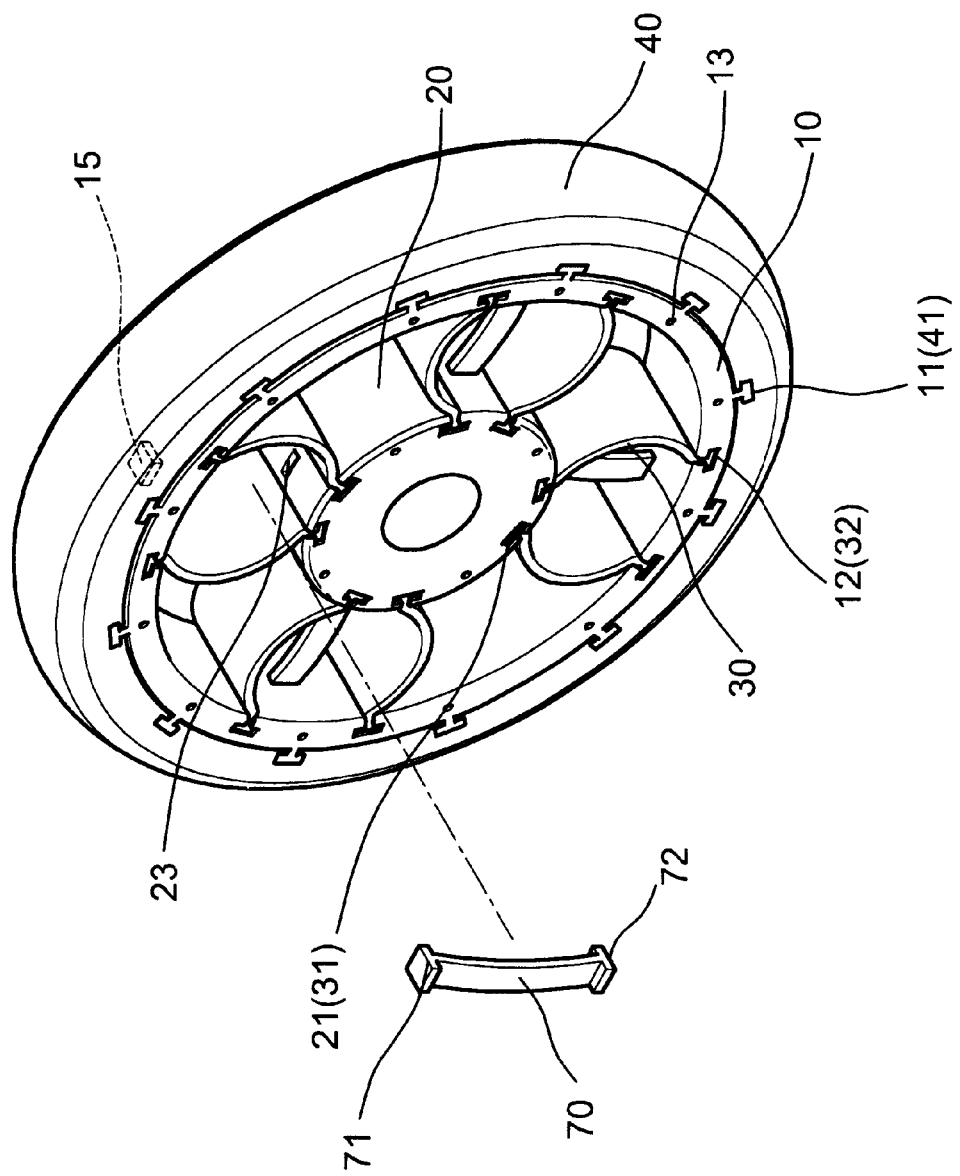
FIG. 5 is an exploded perspective view to show a plurality of radial supports disposed between the rim and the hub.

The rim 10 has a plurality of splines 11 of T-shaped section formed spaced apart on outer periphery, a plurality of T-shaped grooves 12 formed spaced apart in inner periphery on pair by pair basis and extending about half width of the inner periphery and a plurality of retaining holes 13 and 14 formed spaced apart in two lateral sides between the T-shaped grooves 12. The rim 10 further has a plurality of the positioning recesses 15 centrally formed spaced apart in the inner periphery perpendicular to each other (as shown in FIG. 5).

The hub 20 has also a plurality of T-shaped grooves 21 formed spaced apart in outer periphery on pair by pair basis and extending about half width of the outer periphery and a plurality of retaining holes 22 formed spaced apart in an outer end between the T-shaped grooves 21. The hub 20 further has a plurality of positioning recesses 23 centrally formed spaced apart in outer periphery perpendicular to each other and made in registry with the positioning recesses 15 of the rim 10 (as shown in FIG. 5).

The arcuate spring plates 30 each have a pair of T-shaped retaining ends 31 and 32 made respectively engageable with the T-shaped grooves 12 and 21 of the rim 10 and the hub 20.

The tire 40 is made of solid rubber and has a plurality of T-shaped grooves 41 formed spaced apart in inner periphery slidably engageable with the T-shaped splines 11 of the rim 10.

The pair of rim shields 50 each has a plurality of retaining pins 51 centrally formed spaced apart on inner side made engageable with the retaining holes 13 and 14 of the rim 10.

The hub shield 60 has a plurality of retaining pins 61 formed spaced apart on inner side made engageable with the retaining holes 22 of the hub 20.

The radial supports 70 each a spring plate and a pair of rectangular positioning plates 71 and 72 perpendicular to two ends and made engageable with the positioning recesses 15 and 23 respectively.

When assembling, first connect the rim 10 with the hub 20 by the plurality of arcuate spring plates 30 which slide their T-shaped retaining plates 31 and 32 respectively to the corresponding T-shaped grooves 12 and 21 of the rim 10 and the hub 20 (as shown in FIG. 3), secondly engage the rectangular positioning plates 71 and 72 of the radial supports 70 into their corresponding positioning recesses 15 and 23 of the rim 10 and the hub 20 (as shown in FIG. 5) which may need suitable tool to slightly bend then the engagement may be easier, thirdly, engage the retaining pins 61 of the hub shield 60 within the retaining holes 22 of the hub 20 and secure it with pressure. Fourthly, mount the tire 40 on the rim 10 by sliding the T-shaped splines 11 of the rim 10 into the T-shaped grooves 41 of the tire 40, finally, engage the retaining pins 51 of the pair of the rim shield 50 with the retaining holes 13 and 14 on two sides of the rim 10 so that a shock-absorbing safety wheel is therefor accomplished.

This type of safety wheel has a self shock-absorbing function and can be adapted to any motorized vehicle and provides a greater shock-absorbing effect because the original shock absorption devices of the vehicle remain unchanged. Further, the solid tire of the invention will not break off or become flat so as to reduce the need for a spare tire, which will further reduce the load of the vehicle.

Note that the specification relating to the above embodiment should be construed as exemplary rather than as limitative of the present invention, with many variations and modifications being readily attainable by a person of average skill in the art without departing from the sprit or scope thereof as defined by the appended claims.

I claim:

1. A shock-absorbing safety wheel for motorized vehicles comprising:

a rim having a plurality of T-shaped splines formed spaced apart on the outer periphery, a plurality of first T-shaped grooves formed spaced apart on the inner periphery on pair by pair basis, the length of the grooves extending about half way across the width of the rim, a plurality of first retaining holes formed spaced apart in two lateral sides of the rim between the first T-shaped grooves and a plurality of positioning recesses centrally formed spaced apart in the inner periphery of the rim perpendicular to each other;

a hub concentrically positioned at the center of the rim and having a plurality of second T-shaped grooves formed spaced apart in the outer periphery on pair by pair basis extending about half way across the width of the hub, a plurality of second retaining holes formed spaced apart in an outer end between the second T-shaped grooves and a plurality of second positioning recesses centrally formed spaced apart in outer periphery perpendicular to each other and in registry with the first positioning recesses of the rim;

a plurality of arcuate spring plates each having a pair of T-shaped retaining ends respectively engaged with the first and second positioning recesses of the rim and the hub;

a hub shield having a plurality of first retaining pins formed spaced apart on inner side engaged within the second retaining holes of the hub;

a tire made of solid rubber having a plurality of third T-shaped grooves formed spaced apart in inner periphery slidably engaged with the T-shaped splines of the rim; and a pair of rim shields respectively mounted on two lateral sides of the rim each having a plurality of first retaining pins centrally formed spaced apart on the inner sides of the rim shields engaged within the first retaining holes of the rim respectively;

whereby a shock-absorbing safety wheel is accomplished.

2. The shock-absorbing safety wheel of claim 1, further comprising a plurality of radial supports each comprising a spring plate and a rectangular retaining plate perpendicular to each end of the spring plate and respectively engaged within the first and second positioning recesses of the rim and the hub.

* * * * *